(12) United States Patent
Lawrence et al.

(10) Patent No.: US 8,072,095 B2
(45) Date of Patent: Dec. 6, 2011

(54) POWER MANAGEMENT FOR POWER CONSTRAINED DEVICES

(75) Inventors: Gary J. Lawrence, Merrimack, NH (US); Paul E. Gili, Mason, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 339 days.

(21) Appl. No.: 12/472,279

(22) Filed: May 26, 2009

(65) Prior Publication Data
US 2010/0301669 A1 Dec. 2, 2010

(51) Int. Cl.
*H02J 3/14* (2006.01)
*H02J 7/00* (2006.01)
(52) U.S. Cl. .......................... 307/31; 320/166
(58) Field of Classification Search .......... 307/55, 307/43, 31; 320/166
See application file for complete search history.

(56) References Cited

U.S. PATENT DOCUMENTS

| | | | |
|---|---|---|---|
| 6,326,772 B2* | 12/2001 | Kusumoto et al. | 320/166 |
| 6,882,128 B1* | 4/2005 | Rahmel et al. | 320/101 |
| 2007/0281657 A1 | 12/2007 | Brommer et al. | |
| 2009/0072950 A1 | 3/2009 | Gili et al. | |
| 2009/0284351 A1 | 11/2009 | Rossman et al. | |

* cited by examiner

*Primary Examiner* — Michael Rutland Wallis
(74) *Attorney, Agent, or Firm* — Finch & Maloney PLLC; Neil F. Maloney

(57) ABSTRACT

Techniques are disclosed for optimizing power consumption in electronic devices that operate on battery-based or scavenged power. The power scavenged or otherwise supplied by such devices may therefore last longer, allowing longer performance on a given charge (whether sourced from scavenged power, battery power, or a combination thereof). An energy distribution circuit can be used in conjunction with a hysteretic switch, wherein the hysteretic switch can be used to switch an energy storage element in-circuit (so that it can provide charge to sub-circuitry or components) when the charge stored on that element exceeds a given charge threshold; otherwise, the hysteretic switch presents as a high resistance or open circuit when the charge stored on the energy storage element drops below a lower recharge threshold. The energy distribution circuit can be configured for adaptively providing different discharge rates for different loads.

20 Claims, 6 Drawing Sheets

POWER MANAGEMENT FOR POWER CONSTRAINED DEVICES

STATEMENT OF GOVERNMENT INTEREST

The invention was made with United States Government support under contract FA9453-05-D-0176 awarded by the United States Air Force, and the United States Government may have certain rights in this invention.

FIELD OF THE INVENTION

The invention relates to power management, and more particularly, to techniques for optimizing the use of energy in power constrained electronic devices.

BACKGROUND OF THE INVENTION

In electronic devices having battery-based or scavenged power sources, a charge storage capacitor is typically used as the energy storage element. An example such device is a passive radio-frequency identification (RFID) tag. When two or more sub-circuits of the device are directly connected to that storage element, the discharge time of the entire device is determined by the shortest time constant of any of the sub-circuits. This is the case, regardless of varying power demands of the various sub-circuits. As a result, the power scheme is not optimal, and may limit application of the device.

There is a need, therefore, for techniques for optimizing power consumption in electronic devices having limited power supplies.

SUMMARY OF THE INVENTION

One embodiment of the present invention provides a system for optimizing the use of energy consumption by electronics having multiple loads. The system includes a hysteretic switch circuit having an input for coupling to an energy storage circuit and an output coupled to a node, the hysteretic switch circuit for coupling power stored by the energy storage circuit to the node when the power stored by the energy storage circuit reaches a charge threshold. The system further includes an energy distribution circuit having an input coupled to the node, and for controlling operating time during which DC voltage above an operating threshold voltage is presented to each of a plurality of device loads coupled to an output of the energy distribution circuit, wherein at least two of the device loads have different operating times. In some cases, at least two of the device loads have different operating threshold voltage ranges. The system may further include the energy storage circuit. In one specific case, the energy storage circuit includes a capacitor capable of storing potential electrical energy from a DC power source. The system may include a DC power source for providing DC electrical power to the system. The DC power source may include, for example, a battery and/or an antenna operatively coupled to a rectifier, wherein RF energy scavenged by the antenna is rectified to provide DC power. In another specific case, a first device load can be coupled to the node (prior to the energy distribution circuit). In another specific case, the energy distribution circuit comprises at least one diode and one capacitor associated with each of at least two of its outputs, the at least one diode for setting a maximum DC voltage provided by that output, and the at least one capacitor for setting the operating time associated with that output. In another specific case, the energy distribution circuit is for controlling an amount of energy that is allotted for each of at least two of the device loads.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
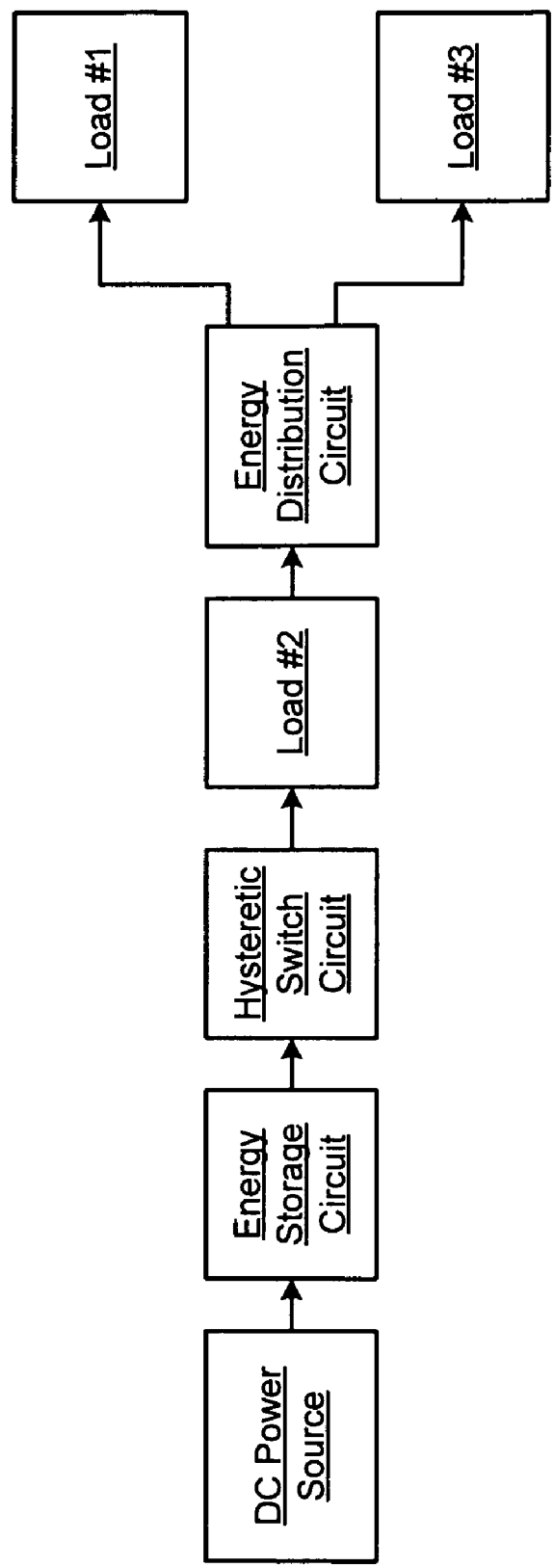
FIG. 1 illustrates a block diagram of a power constrained system configured for optimizing the use of energy, in accordance with an embodiment of the present invention.

Techniques are disclosed for optimizing power consumption in electronic devices having limited power (e.g., battery-based or scavenged power), such as RFID tags or other devices that can operate on battery-based or scavenged power. The power scavenged or otherwise supplied by such devices may therefore last longer, allowing longer performance on a given charge (whether sourced from scavenged power, battery power, or a combination thereof).

General Overview

As previously explained, in electronic devices having battery-based or scavenged power sources, a charge storage capacitor can be used as the energy storage element. The charge can be provided to the storage device by, for example, a rectenna circuit. As is known, a rectenna is configured with an antenna operatively coupled to a rectification circuit. In such devices, RF energy collected or otherwise 'scavenged' by the antenna is rectified to provide DC power, which is then stored in the capacitor (or other suitable energy storage element). This rectified, stored DC power can then be used to power one or more sub-circuits directly connected to the energy storage element.

In cases where the electronic device includes multiple sub-circuits each having a different load, the discharge time of the entire device is typically determined by the shortest time constant of any of the sub-circuits. A disadvantage of such conventional power schemes is that there is no way of controlling the per-charge lifetime or the amount of energy allotted for each sub-circuit or component at the output of the energy storage element. However, and in accordance with an embodiment of the present invention, by appropriately providing different charge storage capacitances for different loads, the per-charge lifetime of each sub-circuit/component can be individually controlled, thereby optimizing the overall power consumption and performance of the power constrained electronic device. Said differently, the time period during which a sub-circuit functions on a single charge can be optimized or otherwise extended.

This optimization can be achieved, for example, by integrating an energy distribution circuit, which in some embodiments includes switching diode and capacitor circuitry. The energy distribution circuit can be used in conjunction with a hysteretic switch, wherein the hysteretic switch can be used to switch the energy storage element in-circuit (so that it can provide charge to sub-circuitry or components) when the charge stored on that element exceeds a given charge threshold. The hysteretic switch presents as a high resistance or open circuit when the charge stored on the energy storage element is below a lower turn-off threshold.

Thus, the energy distribution circuit can be configured for adaptively providing different discharge rates for different loads. Such a circuit is particularly useful in devices requiring extremely low DC Power (such as the case with passive RFID tags and other batteryless power scavenging devices).

Example Multi-Load System

FIG. 1 illustrates a block diagram of a power constrained system configured for optimizing the use of energy, in accordance with an embodiment of the present invention. As can be seen, the system includes a DC power source, an energy storage circuit, a hysteretic switch circuit, and an energy distribution circuit. In addition to these components, the system includes three different device loads (e.g., sub-circuits within the system that require power). Load #2 is attached to the output of the hysteretic switch circuit, and load #1 and 3 are attached to the output of the energy distribution circuit. Each of these loads can be associated with different power requirements.

The DC power source can be, for example, a source of a small amount of a DC electrical power (e.g., 0.5 to 5.0 volts DC). One example such DC power source is a battery with a relatively limited or short lifetime. Any number of conventional battery technologies can be used (e.g., electrolytic cells, galvanic cells, voltaic piles, fuel cells, and flow cells), whether rechargeable or not. Another example DC power source can be implemented with a rectenna, which as previously explained operates to convert RF power to DC power, wherein RF energy scavenged by an antenna is rectified to provide DC power. Any number of conventional rectification technologies can be used. In some cases, both a battery and rectenna can be used. For instance, the rectenna circuit can be used to extend battery-life by supplementing additional DC power/energy when RF energy is available for scavenging. Specific example embodiments will be discussed with reference to FIGS. 2a-c.

The power produced by the DC power source is stored in the energy storage circuit. This circuitry can be implemented, for example, with a capacitor capable of storing potential electrical energy from the output of the DC power source. Other suitable energy storage devices/circuitry will be apparent in light of this disclosure. Specific embodiments will be discussed with reference to FIGS. 2a-c.

The hysteretic switch circuit is an electrical circuit that provides a small resistance (switch is effectively closed) from the input to output when the input voltage provided by the energy storage circuit reaches a specified charge threshold (e.g., turn-on threshold). When the input voltage falls below a lower specified charge threshold (e.g., turn-off threshold), the hysteretic switch circuit provides a large resistance (switch is effectively open) from input to output. Specific example embodiments will be discussed with reference to FIGS. 2a-c.

Each of device loads 1, 2, and 3 represents any active electrical components/devices/circuitry making up or otherwise contributing to the functionality of the system. For instance, in the context of a laptop, load #1 might be that associated with powering a disk drive, load #2 might be that associated with powering a LCD display, and load #3 might be that associated with a CPU. Note that the system can be made up of discrete components, integrated circuitry, or a combination of both. In any case, the three device loads 1-3 generally include electrical components that require DC power/energy to operate correctly. However, they do not necessarily require the same amount of DC power/energy to function properly. Further note that the number of device loads can vary from one system to the next. In FIG. 1, three loads were chosen as an example, but fewer or greater loads may be used in other embodiments of the present invention, as will be apparent in light of this disclosure. The number of device loads will generally depend on the requirements of the system.

In this example embodiment, the energy distribution circuit operates to distribute the amount of electrical energy provided to device load #1 and device load #3, and thereby controls the amount of energy allocated for each device load #1 and device load #3. Such adaptive distribution can be useful in many situations. For example, consider the situation where some devices in the system need to operate for a longer period of time than other devices. In such cases, the energy distribution circuit will allow stored power from the energy storage circuit to discharge to load #1 at one rate, and discharge to load #3 at a different rate.

There are a number of benefits of incorporating an energy distribution circuit at the output of a hysteretic switch. For instance, and in the context of scavenging DC power (from an RF power supply) to provide DC power to a DC Powered circuit, the energy distribution circuit allows control of the maximum DC voltage presented to each component (at the energy distribution circuit output) of the DC powered circuit. In addition, each component can have a different maximum DC voltage presented to it by adding or removing diodes from the energy distribution circuit. The energy distribution circuit also allows control of the amount of scavenged energy that is allotted for each component (at the energy distribution circuit output) of the DC powered circuit. The energy distribution circuit also allows control of the amount of time each component (at the energy distribution circuit output) of the DC powered circuit is powered (above a certain voltage). This is achieved, for instance, by varying an output capacitor (in the energy distribution circuit) associated with each component in the DC powered circuit.

Figure 2A:
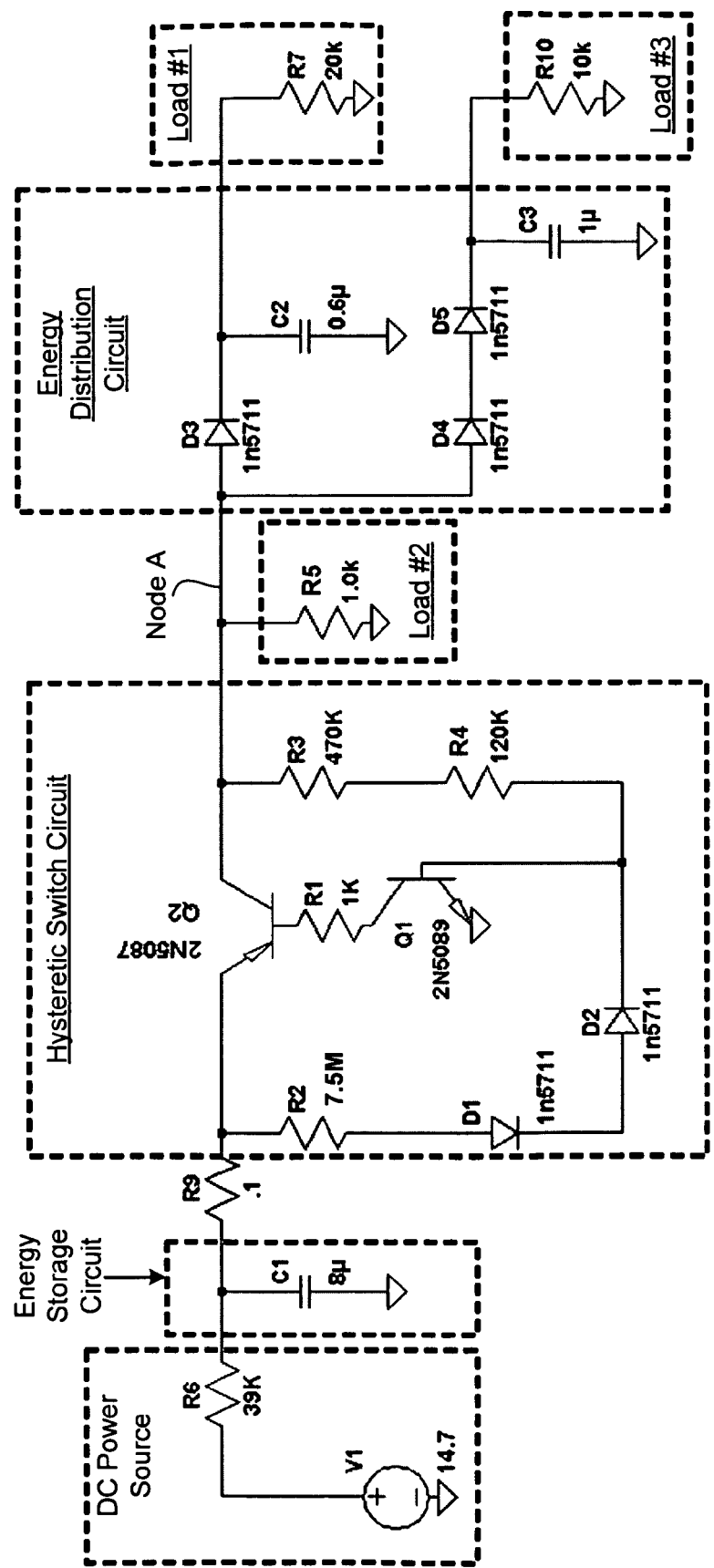
FIG. 2a illustrates an example schematic of the system shown in FIG. 1, configured in accordance with an embodiment of the present invention.

FIG. 2a illustrates an example schematic of the system shown in FIG. 1, configured in accordance with an embodiment of the present invention. The example configuration includes specific details such as component values, input/output voltage levels and load values. These details are provided to show an example only, and are not intended to limit the scope of the present invention. Numerous other configurations will be apparent in light of this disclosure.

The DC power source of this example is configured to provide DC power for device loads 1-3, using an RF power scavenging source having an open circuit voltage of about 14.7 VDC (designated as V1) and a series resistance of about 39 KΩ (designated as R6). Device loads 1-3 are generally designated as resistors for simplicity, where is load #1 is designated R7 (about 20 KΩ), load #2 is designated R5 (1.0

KΩ), and load #3 is designated R10 (10 KΩ). The energy storage device is a capacitor (C1), which in this example is 8 µF. The hysteretic switch circuit of this example embodiment includes transistors Q1 and Q2 (e.g., Q1: PNP 2N5089 and Q2: NPN 2N5087, in surface mount package, if desired) coupled as shown along with diodes D1 and D2 (e.g., both 1N5711, in surface mount package, if desired) and resistors R1-R4 (e.g., 1 KΩ, 7.5 MΩ, 470 KΩ, and 120 KΩ, respectively, in thin or thick film deposited on substrate, if so desired). The energy distribution circuit of this example embodiment includes diodes D3-D5 (e.g., each 1N5711, in surface mount package, if desired) and capacitors C2 and C3 (e.g., 0.6 µF and 1.0 µF, respectively) coupled as shown. The diodes are used to adjust the maximum DC voltage provided to the respective load, and the capacitors are used to set the discharge time and effectively how long the respective load can be powered before the DC voltage being provided drops below a certain threshold. In this particular example, diode D3 is used to adjust down (e.g., by about 0.4 VDC, or one Schottky junction drop) the maximum voltage applied to device load #1 by the energy distribution circuit, while diodes D4 and D5 are used to adjust down (e.g., by about 0.8 VDC, or two Schottky junction drops) the maximum voltage applied to device load #3 by the energy distribution circuit. With respect to discharge time, each of capacitors C2 and C3 operate to form an RC time constant in conjunction with the resistance of the corresponding load device. For instance, the operation time for device load 1 can generally be determined from the $R_{Load}*C_2$ product and operation time for device load 3 can generally be determined from the $R_{Load}*C_3$ product. As explained herein, this operation time is the time during which the DC voltage presented to the device load is at or above an operating threshold voltage. Thus, once the resistance of the corresponding load and the desired operating threshold voltage for that load are known, the value of each capacitor (in Farads) can be selected to provide the desired operation time.

Figure 2B:
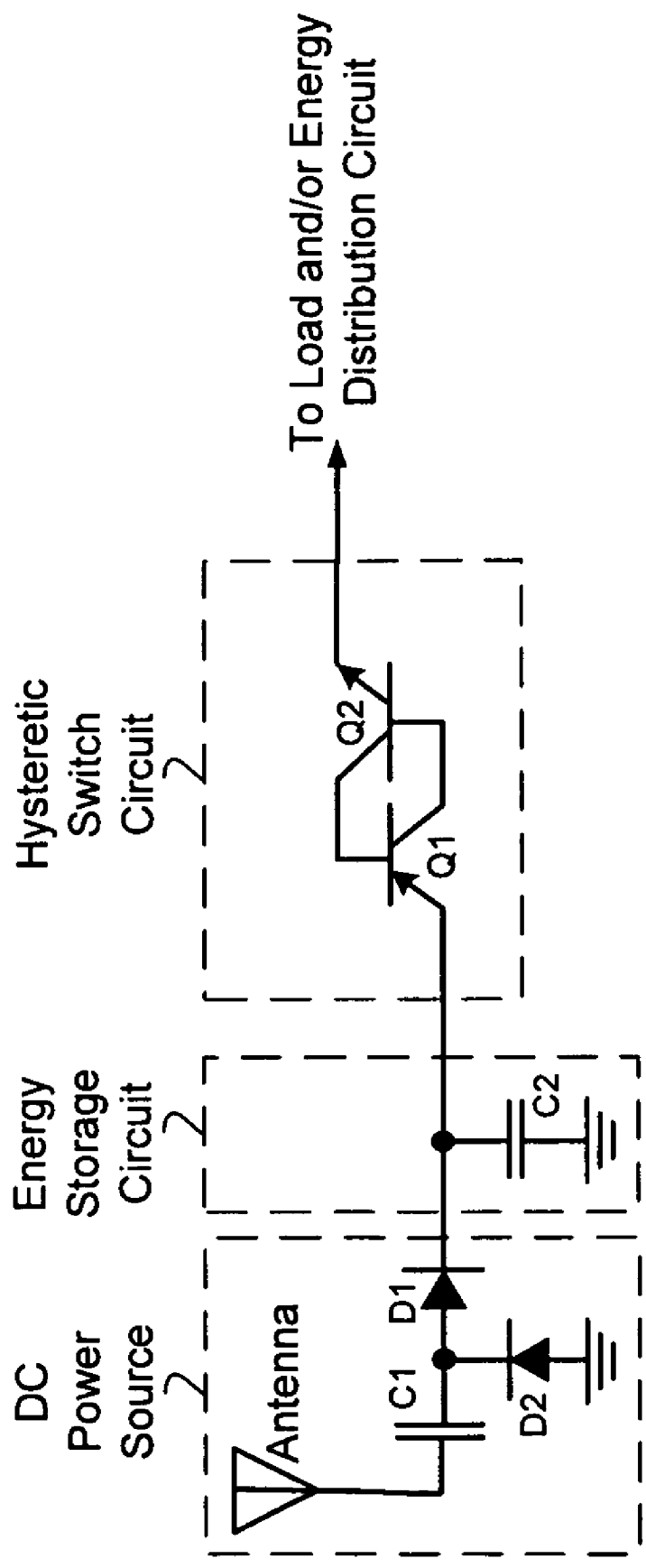
FIG. 2b illustrates an example schematic of a rectenna and hysteretic switch circuit that can be used in the system shown in FIG. 1, in accordance with an embodiment of the present invention.
Figure 2C:
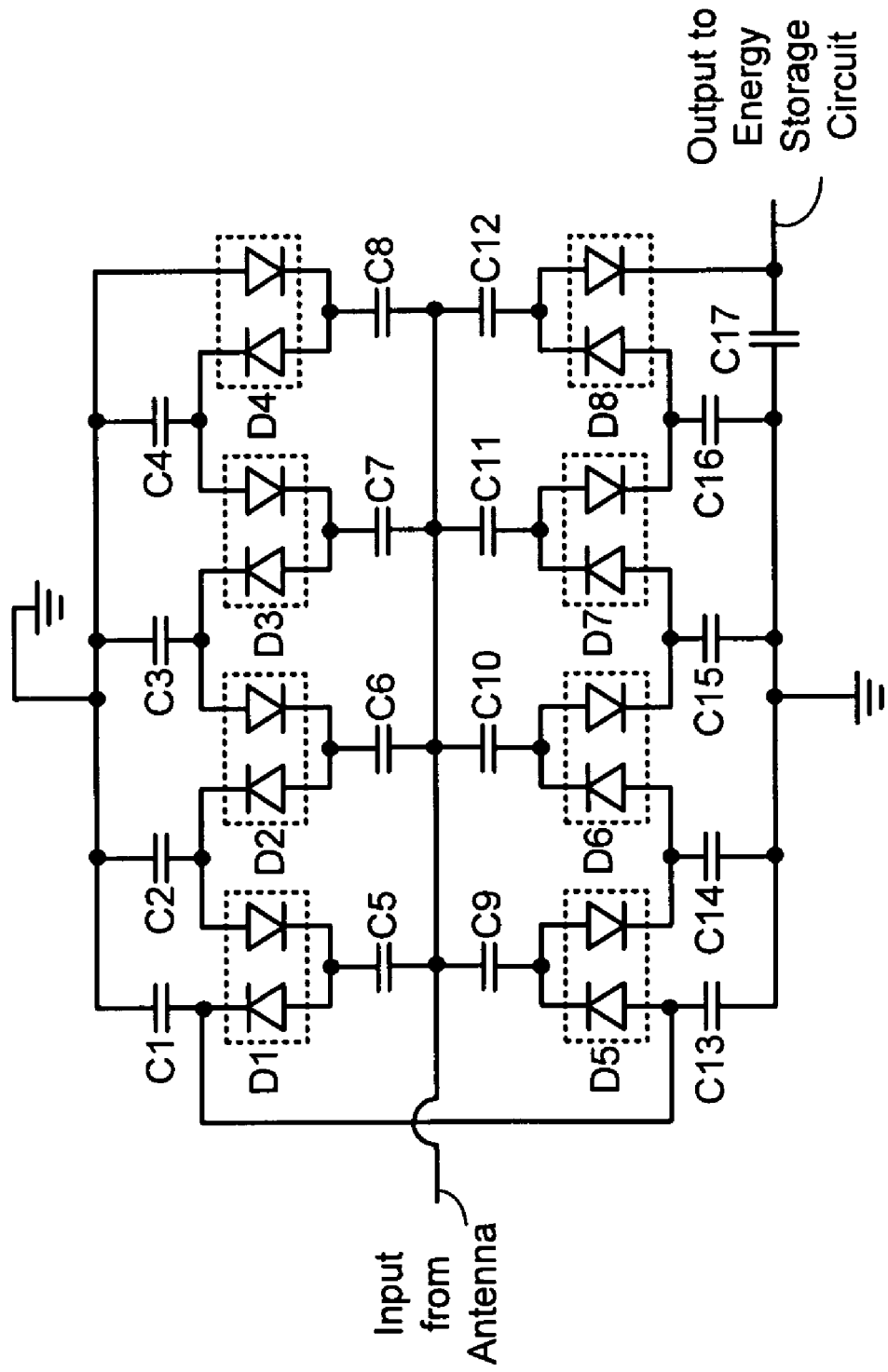
FIG. 2c illustrates an example schematic of a rectifier that can be used in the DC power source shown in FIG. 1, in accordance with an embodiment of the present invention.

For purposes of discussion, assume such circuit values and the various component values have a tolerance in the range of +/−20%, or better. Example RF power scavenging sources are illustrated in FIGS. 2b and 2c. Further assume for the example embodiment shown in FIG. 2a the following performance criteria/parameters for device loads 1, 2, and 3, as shown here in Table 1.

TABLE 1

Performance Criteria for Device Loads 1, 2, and 3

| Parameter | Device Load #1 | Device Load #2 | Device Load #3 |
|---|---|---|---|
| Operating Time | 9 ms or more | 3 ms or more | 6.5 ms or more |
| DC Supply Volt | 2 to 4.4 VDC | 2.4 to 5.2 VDC | 2 to 4.0 VDC |
| DC Current Draw | 100 uA | 2.4 mA | 200 uA |
| Approximate Load | 20 KΩ (2 V/100 uA) | 1 KΩ (2.4 V/2.4 mA) | 10 KΩ (2 V/200 uA) |

As will be discussed in turn, the energy distribution circuit allows each of these parameters to be achieved.

Time-Voltage Graphs

Figure 3:
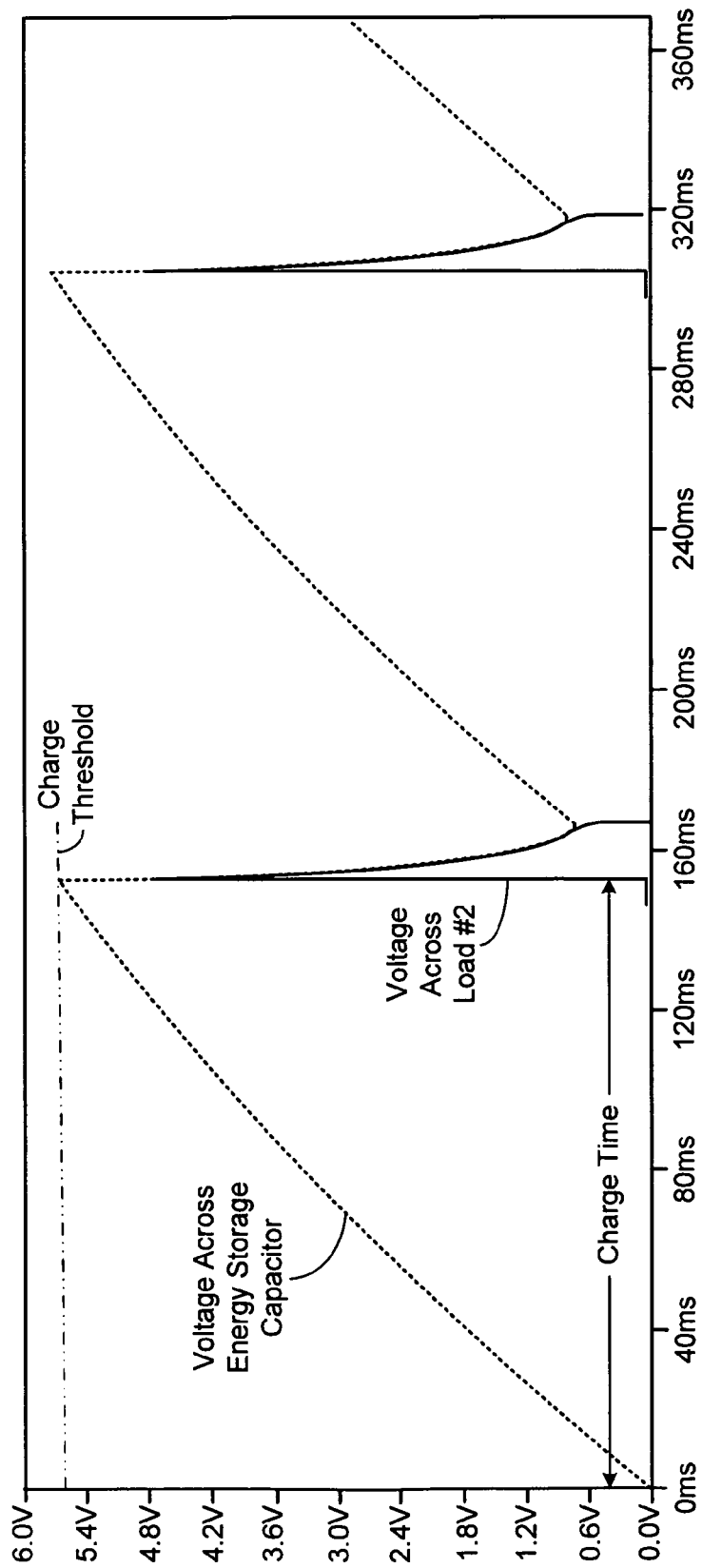
FIG. 3 is a time-voltage graph illustrating charging of the energy storage circuit of the example system shown in FIG. 2a and the voltage across device load 2, in accordance with an embodiment of the present invention.

As can see with reference to the example case shown in FIG. 3, the maximum DC voltage stored across C2 and input to device load #2 is about 5.5 VDC and the time to reach that voltage (from 0 VDC) is about 152 ms. In FIG. 3, the maximum charging level on C2 is generally designated as charge threshold, and the time to reach that voltage is generally designated as charge time. Once the maximum charging level on C2 is reached, the hysteretic switch circuit conducts (or effectively 'turns on') and couples a percentage of the C2 charge to the input of device load #2. Note that there may be some voltage drop across the hysteretic switch circuit, such that the circuit's output voltage is less than its input voltage. In this particular example, the maximum DC voltage at the output of the hysteretic switch circuit (and input to device load #2) is about 4.8 VDC.

Figure 4:
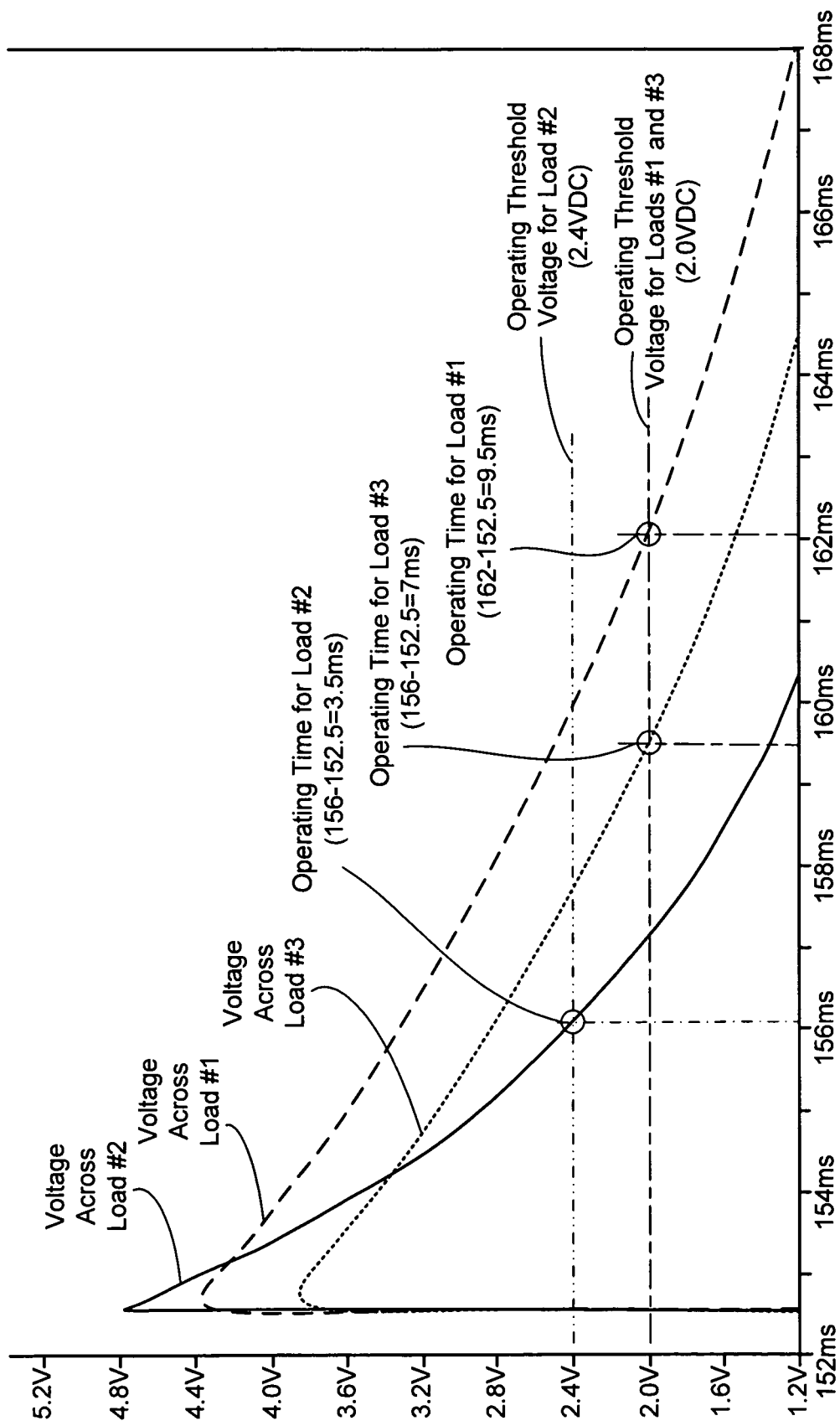
FIG. 4 is a time-voltage graph illustrating the voltage across device loads 1, 2, and 3 of the example system shown in FIG. 2a, in accordance with an embodiment of the present invention.

FIG. 4 further illustrates the maximum DC voltages at the input to each of the device loads 1, 2, and 3. As can be seen, the max DC voltage presented to the device load #1 is about 4.36 VDC, and the max DC voltage presented to the device load #2 is about 4.8 VDC, and the max DC voltage presented to the device load #3 is about 3.85V VDC. In this example configuration, the max DC voltage presented to the device load #1 is essentially a Schottky diode junction (i.e., D3) lower than the max DC voltage presented to the device load #2. In addition, the max DC voltage presented to the device load #3 is essentially two Schottky diode junctions (i.e., D4 and D5) lower than the max DC voltage presented to the device load #2. Recall that the voltage drop (or other voltage adjustment) across the energy distribution circuit will depend on factors such as the type and/or quantity of junctions and/or the resistive divider employed. Any one or combination of voltage adjusting technologies can be used to implement the energy distribution circuit.

With further reference to the example time-voltage graphs of FIG. 4, note that each of the performance criteria of Table 1 have been satisfied. In particular, device load #1 requires a DC supply voltage in the range of 2 to 4.4 VDC for 9 ms or more on a single charge of the storage element C1. As can be seen with reference to FIG. 4, the actual operating time for device load #1 is about 9.5 ms, with an operating threshold voltage of 2.0 VDC or higher. Device load #2 requires a DC supply voltage in the range of 2.4 to 5.2 VDC for 3 ms or more on a single charge of the storage element C1. As can further be seen, the actual operating time for device load #2 is about 3.5 ms, with an operating threshold voltage of 2.4 VDC or higher. Device load #3 requires a DC supply voltage in the range of 2 to 4 VDC for 6.5 ms or more on a single charge of the storage element C1. As can further be seen, the actual operating time for device load #3 is about 7 ms, with an operating threshold voltage of 2.0 VDC or higher.

As previously explained, the energy distribution circuit allows control of the amount of scavenged energy that is allotted to each device load included in the system. For instance, and with further reference to FIGS. 2a and 4, the energy allotted for device load #1 can be computed as (0.5) (C2) (Max DC Voltage)$^2$, which equals (0.5) (0.6 µF) (4.36V)$^2$=5.7 µJ. Similarly, the energy allotted for device load #3 can be computed as (0.5) (C3) (Max DC Voltage)$^2$, which equals (0.5) (1.0 µF) (3.85V)$^2$=7.4 µJ. As shown by the calculations above, the energy allotted for device load #1 and device load #3 can be controlled by varying the maximum DC voltage presented to the device and/or by varying the capacitors C2 and C3. In addition, recall that the maximum DC voltage presented to device load #1 and device load #3 can be controlled by the number of series diodes (e.g., D3, D4, D5).

Although Schottky diodes are used in this example, other embodiments may include other diode/junction types (e.g., silicon, germanium, etc).

The energy distribution circuit also controls the amount of time each load is powered above a certain operating threshold voltage. This is done by setting the output capacitor in the energy distribution circuit associated with each device load, as needed. In the example provided in FIG. 2a, the amount of time the device load #3 operating threshold voltage is at or above 2.0 VDC can be adjusted by varying the capacitance of C3. Likewise, the amount of time the device load #1 operating threshold voltage is at or above 2.0 VDC can be adjusted by varying the capacitance of C2.

Alternative Configurations and Circuitry

Although shown as driving two device loads in FIG. 2a, the energy distribution circuit can be configured to provide power to any number of loads (e.g., 3, 4, or more). In addition, the energy distribution circuit can use any number of diodes and capacitors to adjust or otherwise set the maximum DC supply voltage for each load and the operating time (e.g., to operating threshold voltage for that load), respectively. The energy distribution circuit is not intended to be limited to diodes and capacitors. Rather, other embodiments can use alternative voltage adjusting mechanisms such as resistive dividers, transistors, and other voltage setting circuitry. Likewise, other embodiments can use alternative discharge time adjusting mechanisms such as various other RC circuits, LC circuits, and transistor circuits (or other active circuitry) configured to actively couple small amounts of charge over a set period of time from the hysteretic switch output to the corresponding device load. Thus, the actual configuration of the energy distribution circuit can vary and will depend on factors such as the desired complexity, power constraints, and cost.

As will be further apparent in light of this disclosure, the energy distribution circuit can be used with any number of DC voltage sources and/or hysteretic switch circuits. For instance, FIG. 2b illustrates an example schematic of a specific DC voltage source implemented with a rectenna used in conjunction with an energy storage circuit (C2) and a hysteretic switch circuit, configured in accordance with an embodiment of the present invention. The DC power source (or rectenna) is configured with an antenna operatively coupled to a rectification circuit that includes capacitor C1 and diodes D1 and D2, and provides DC power to capacitor C2 by rectification of RF energy collected by the antenna. The antenna can be implemented with conventional technology, and will depend on the frequency band of interest (numerous radiative structures can be used). Similarly, the values of capacitors C1 and C2 will depend on the frequency band of interest and the amount of RF energy to be stored. Likewise, diodes D1 and D2 can be selected based on the frequency band of interest and the amount of RF energy to be stored. In one specific example embodiment, the antenna is implemented with a 2.4 GHz surface mount or monopole antenna (e.g., Antenova, Ltd., P.N. 3030A6250-01). Diodes D1 and D2 can be implemented, for example, with hot carrier RF detector diodes (e.g., Avagotech, P.N. HSCH5340). Capacitor C1 can be implemented, for example, with a 100 pF antenna coupling capacitor, and capacitor C2 can be implemented, for example, with luF energy storage capacitor. The hysteretic switch circuit is implemented with transistors Q1 and Q2 coupled as shown (e.g., Q1: PNP 2N5089 and Q2: NPN 2N5087, in surface mount package, if desired). Other hysteretic switching schemes will be apparent in light of this disclosure. In any such cases, the hysteretic switch circuit is operative to switch capacitor C2 to a node (designated node A) associated with device load #2 and the energy distribution circuit when the voltage across capacitor C2 is above a predetermined level, and to maintain the connection of capacitor C2 to node A until such time as the charging on capacitor C2 drops below a predetermined lower turn-off level. In this way, the hysteretic switch circuit allows conduction of electrical current when a charge threshold is reached (which triggers operation of the devices loads 1, 2, and 3), and continues to allow conduction of electrical current until a lower recharge threshold is reached, at which time conduction ceases (and device loads 1, 2, and 3 stop operating after their discharge times expire). With a DC power source operatively coupled to the capacitor C2, this charging-discharging-recharging process can continually repeat. As previously explained, the DC power source may be battery-based, scavenging-based, or a combination thereof.

FIG. 2c illustrates an example schematic of another rectifier circuit that can be used in the DC power source shown in FIG. 1, in accordance with an embodiment of the present invention. This example RF power scavenging source configuration provides an open circuit voltage of about 14.7 VDC and a series resistance of about 39 KΩ. Each of the capacitors C1-16 can be implemented, for example, with a 47 pF surface mount capacitor and each of the diode pairs D1-D8 can be implemented, for instance with surface mount microwave Schottky detector diodes (e.g., HSMS-286C-TR1, or discrete diodes coupled to form pairs as shown). Capacitor C17 can be implemented, for example, with a 2.2 µF surface mount capacitor. The RF input power from the antenna can be coupled to the rectifier input, for example, via a 50Ω source impedance (e.g., through SMA or other suitable connector).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for optimizing the use of energy consumption by electronics having multiple loads, the system comprising:
    a hysteretic switch circuit having an input for coupling to an energy storage circuit and an output coupled to a node, the hysteretic switch circuit for coupling power applied at its input to the node when the power stored by the energy storage circuit reaches a charge threshold; and
    an energy distribution circuit having an input coupled to the node, and for controlling operating time during which DC voltage above an operating threshold voltage is presented to each of a plurality of device loads coupled to an output of the energy distribution circuit, wherein at least two of the device loads have different operating times.

2. The system of claim 1 wherein at least two of the device loads have different operating threshold voltage ranges.

3. The system of claim 1 further comprising the energy storage circuit.

4. The system of claim 3 wherein the energy storage circuit includes a capacitor capable of storing potential electrical energy from a DC power source.

5. The system of claim 1 further comprising a DC power source for providing DC electrical power to the system.

6. The system of claim 5 wherein the DC power source includes a battery.

7. The system of claim 5 wherein the DC power source includes an antenna operatively coupled to a rectifier, wherein RF energy scavenged by the antenna is rectified to provide DC power.

8. The system of claim 1 wherein a first device load is coupled to the node.

9. The system of claim 1 wherein the energy distribution circuit comprises at least one diode and one capacitor associated with each of at least two of its outputs, the at least one diode for setting a maximum DC voltage provided by that output, and the at least one capacitor for setting the operating time associated with that output.

10. The system of claim 1 wherein the energy distribution circuit is for controlling an amount of energy that is allotted for each of at least two of the device loads.

11. A system for optimizing the use of energy consumption by electronics having multiple loads, the system comprising:
a DC power source for providing DC electrical power;
an energy storage circuit for storing power produced by the DC power source;
a hysteretic switch circuit having an input coupled to the energy storage circuit and an output coupled to a node, the hysteretic switch circuit for coupling power stored by the energy storage circuit to the node when the power stored by the energy storage circuit is above a charge threshold; and
an energy distribution circuit having an input coupled to the node, and for controlling operating time during which DC voltage above an operating threshold voltage is presented to each of a plurality of device loads coupled to an output of the energy distribution circuit, wherein at least two of the device loads have different operating times.

12. The system of claim 11 wherein at least two of the device loads have different operating threshold voltage ranges.

13. The system of claim 11 further comprising the energy storage circuit, wherein the energy storage circuit includes a capacitor capable of storing potential electrical energy from a DC power source.

14. The system of claim 11 further comprising a DC power source for providing DC electrical power to the system, wherein the DC power source includes at least one of a battery and/or an antenna operatively coupled to a rectifier, wherein RF energy scavenged by the antenna is rectified to provide DC power.

15. The system of claim 11 wherein the energy distribution circuit comprises at least one diode and one capacitor associated with each of at least two of its outputs, the at least one diode for setting a maximum DC voltage provided by that output, and the at least one capacitor for setting the operating time associated with that output.

16. The system of claim 11 wherein the energy distribution circuit is for controlling an amount of energy that is allotted for each of at least two of the device loads.

17. A system for optimizing the use of energy consumption by electronics having multiple loads, the system comprising:
a DC power source for providing DC electrical power to the system, wherein the DC power source includes at least one of a battery and/or an antenna operatively coupled to a rectifier, wherein RF energy scavenged by the antenna is rectified to provide DC power;
a hysteretic switch circuit having an input for coupling to an energy storage circuit and an output coupled to a node, that hysteretic switch circuit for coupling power applied at its input to the node when the power stored by the energy storage circuit reaches a charge threshold; and
an energy distribution circuit having an input coupled to the node, and for controlling operating time during which DC voltage above an operating threshold voltage is presented to each of a plurality of device loads coupled to an output of the energy distribution circuit, wherein the energy distribution circuit comprises at least one diode and one capacitor associated with each of at least two of its outputs, the at least one diode for setting a maximum DC voltage provided by that output, and the at least one capacitor for setting the operating time associated with that output, and wherein at least two of the device loads have different operating times, and wherein at least two of the device loads have different operating threshold voltage ranges.

18. The system of claim 17 further comprising the energy storage circuit, for storing DC power provided by the DC power source.

19. The system of claim 18 wherein the energy storage circuit includes a capacitor capable of storing potential electrical energy from a DC power source.

20. The system of claim 17 wherein the energy distribution circuit is for controlling an amount of energy that is allotted for each of at least two of the device loads.

* * * * *